US012518165B2

(12) United States Patent
Xiao et al.

(10) Patent No.: US 12,518,165 B2
(45) Date of Patent: Jan. 6, 2026

(54) METHOD AND SYSTEM FOR CONVOLUTION WITH WORKLOAD-BALANCED ACTIVATION SPARSITY

(71) Applicant: MOFFETT INTERNATIONAL CO., LIMITED, Hong Kong (HK)

(72) Inventors: Zhibin Xiao, Los Altos, CA (US); Enxu Yan, Los Altos, CA (US); Yong Lu, Los Altos, CA (US); Wei Wang, Los Altos, CA (US)

(73) Assignee: Moffett International Co., Limited, Hong Kong (HK)

( * ) Notice: Subject to any disclaimer, the term of this patent is extended or adjusted under 35 U.S.C. 154(b) by 1147 days.

(21) Appl. No.: 17/091,216

(22) Filed: Nov. 6, 2020

(65) Prior Publication Data

US 2022/0147826 A1    May 12, 2022

(51) Int. Cl.
  *G06N 3/082* (2023.01)
  *G06F 7/544* (2006.01)
  (Continued)

(52) U.S. Cl.
  CPC .......... *G06N 3/082* (2013.01); *G06F 7/5443* (2013.01); *G06F 18/241* (2023.01); *G06N 3/063* (2013.01)

(58) Field of Classification Search
  CPC .......... G06F 18/241; G06F 2207/4824; G06F 7/5443; G06N 3/045; G06N 3/048; G06N 3/063; G06N 3/082; G06V 10/82
  See application file for complete search history.

(56) References Cited

U.S. PATENT DOCUMENTS 11,763,156 B2 *  9/2023 Zhang .................... G06N 3/063
                                                    706/25
12,154,034 B2 * 11/2024 Jiang .................... G06N 3/0464
                       (Continued)

FOREIGN PATENT DOCUMENTS

CN   109948794 A   6/2019
CN   111160516 A   5/2020
                  (Continued)

OTHER PUBLICATIONS

Elsen et al., "Fast Sparse ConvNets", arVix 1911.09723, Nov. 2019, 12 pages.
(Continued)

*Primary Examiner* — Chau T Nguyen
(74) *Attorney, Agent, or Firm* — Sheppard Mullin Richter & Hampton LLP

(57) ABSTRACT

Methods, systems, and apparatus, including computer programs encoded on computer storage media, for convolution with workload-balanced activation sparsity are described. An exemplary method comprises: assigning an input tensor and a weight tensor at a convolution layer into a plurality of processors to perform Multiply-Accumulate (MAC) operations in parallel based on the input tensor and the weight tensor; obtaining a plurality of output values based on results of the MAC operations; constructing one or more banks of output values based on the plurality of output values; for each of the banks, performing a top-K sorting on the one or more output values in the bank to obtain K output values; pruning each of the banks by setting the one or more output values other than the obtained K output values in the each bank as zeros; and constructing an output tensor of the convolution layer based on the pruned banks.

18 Claims, 9 Drawing Sheets

(51) Int. Cl.
*G06F 18/241* (2023.01)
*G06N 3/063* (2023.01)

(56) References Cited

U.S. PATENT DOCUMENTS

| | | | |
|---|---|---|---|
| 2017/0316312 | A1 | 11/2017 | Goyal et al. |
| 2018/0373978 | A1 | 12/2018 | Yu et al. |
| 2019/0392287 | A1* | 12/2019 | Ovsiannikov ............ G06N 3/08 |
| 2020/0104692 | A1* | 4/2020 | Hill ...................... G06N 3/0464 |
| 2020/0134417 | A1 | 4/2020 | Mohapatra et al. |
| 2020/0285949 | A1 | 9/2020 | Baum et al. |
| 2021/0089865 | A1* | 3/2021 | Wang ...................... G06N 3/045 |
| 2021/0125071 | A1* | 4/2021 | Ren ......................... G06N 3/082 |
| 2021/0150362 | A1* | 5/2021 | Zhang .................... G06N 3/063 |
| 2022/0101118 | A1* | 3/2022 | Yan ......................... G06N 3/082 |

FOREIGN PATENT DOCUMENTS

| | | | | |
|---|---|---|---|---|
| EP | 3518176 A1 * | 7/2019 | ............ | G06N 3/063 |
| WO | 2020/190772 A1 | 9/2020 | | |
| WO | WO-2021045976 A1 * | 3/2021 | ........... | G06F 17/153 |

OTHER PUBLICATIONS

Gale et al., "The State of Sparsity in Deep Neural Networks", arVix 1902.09574, Feb. 2019, 15 pages.
Parashar et al., "SCNN: An Accelrator for Compressed-sparse Convolution Neural Networks", arVix 1708.04485, May 2017, 12 pages.
Park et al., "Faster CNNs with Direct Sparse Convolutions and Guided Pruning", International Conference on Learning Representation 2017, 12 pages.
International Search Report and Written Opinion for Application No. PCT/CN2021/129141, mailed on Jan. 29, 2022, 9 pages.
Office Action and Search Report dated Sep. 6, 2022, issued in related Taiwan Application No. 110141250, with English machine translation (16 pages).
Journal Shijie Cao et al. "Efficient and Effective Sparse LSTM on FPGA with Bank-Balanced Sparsity", FPGA '19: Proceedings of the 2019 ACM/SIGDA International Symposium on Field-Programmable Gate Arrays Feb. 2019 ACM Digital Library Feb. 20, 2019, pp. 63-72.
Extended European Search Report dated Mar. 12, 2024, issued in related European Patent Application No. 21888676.0 (9 pages).
Song Han, "Efficient Methods and Hardware for Deep Learning", retrieved (on Jan. 9, 2019) from the Internet: URL:https://stacks.stanford.edu/file/druid:qf934gh3708/EFFICIENT%20METHODS%20AND%20HARDWARE%20FOR%20DEEP%20LEARNING-augmented.pdf, Sep. 1, 2017.
Yun Liang et al., "Omni: A Framework for Integrating Hardware and Software Optimizations for Sparse CNNs", IEEE Transactions on Computer-Aided Desion of Integrated Circuits and Systems, vol. 40, No. 8, Aug. 2021, pp. 1648-1661.
Shail Dave et al., "Hardware Acceleration of Sparse and Irregular Tensor Computations of ML Models: A Survey and Insights", arXiv:2007.00864v1 [cs.AR], Cornell University Library, Jul. 2, 2020.
Office Action and Search Report dated Feb. 5, 2024, issued in related Taiwan Application No. 112107790, with English machine translation (16 pages).
PCT International Preliminary Report on Patentability mailed May 19, 2023, issued in related International Application No. PCT/CN2021/129141 (6 pages).

* cited by examiner

700

710 assigning an input tensor and a weight tensor at a convolution layer into a plurality of processors to perform Multiply-Accumulate (MAC) operations in parallel based on the input tensor and the weight tensor

720 obtaining a plurality of output values based on results of the MAC operations

730 constructing one or more banks of output values based on the plurality of output values, wherein each of the banks comprises one or more of the plurality of output values

740 for each of the banks, performing a top-K sorting on the one or more output values in the bank to obtain K output values, wherein K is a positive integer

750 pruning each of the banks by setting the one or more output values other than the obtained K output values in the each bank as zeros

760 constructing an output tensor of the convolution layer based on the pruned banks

FIG. 7

METHOD AND SYSTEM FOR CONVOLUTION WITH WORKLOAD-BALANCED ACTIVATION SPARSITY

TECHNICAL FIELD

The disclosure relates generally to artificial intelligence, more particularly to convolution process with workload-balanced activation sparsity.

BACKGROUND

Neural networks (NN) are currently the foundation for much modern artificial intelligence (AI) applications such as image and video recognition, recommender systems, classification, medical image analysis, and natural language processing. NNs are employed in various usage scenarios from self-driving cars and detecting cancer to playing complex games. A typical NN may comprise a series of convolution layers where intensive and therefore expensive (computational and energy-wise) convolution operations are performed. A typical convolution layer may involve one or more activation (or input) tensors and one or more weight tensors.

In recent years, various approaches have been developed to improve the computational efficiency of NNs by introducing sparsity to the convolution process in NNs, such as pruning the weight tensors to reduce the number of non-zero weights. Some existing hardware architectures either completely ignore activation sparsity or assume unstructured activation sparsity which may cause workload imbalance when using a parallel processing framework to perform the convolution operations. The imbalanced workload may directly impact the system scalability and performance of the architectures. Accordingly, it is desirable to build a novel system architecture that offers and takes advantage of workload-balanced activation sparsity to improve the efficiency of convolution processes.

SUMMARY

Various embodiments of the present specification may include systems, methods, and non-transitory computer-readable media for convolution with workload-balanced activation sparsity.

According to one aspect, the method for convolution with workload-balanced activation sparsity comprises: assigning an input tensor and a weight tensor at a convolution layer into a plurality of processors to perform Multiply-Accumulate (MAC) operations in parallel based on the input tensor and the weight tensor; obtaining a plurality of output values based on results of the MAC operations; constructing one or more banks of output values based on the plurality of output values, wherein each of the banks comprises one or more of the plurality of output values; for each of the banks, performing a top-K sorting on the one or more output values in the bank to obtain K output values, wherein K is a positive integer; pruning each of the banks by setting the one or more output values other than the obtained K output values in the each bank as zeros; and constructing an output tensor of the convolution layer based on the pruned banks.

In some embodiments, the assigning an input tensor and a weight tensor at a convolution layer into a plurality of processors comprises: obtaining an input tensor and a plurality of weight tensors at the convolution layer in a neural network; segmenting the input tensor into a plurality of sub-tensors and assigning the plurality of sub-tensors into a plurality of processors; and segmenting the plurality of weight tensors into a plurality of weight groups and assigning the plurality of weight groups into the plurality of processors.

In some embodiments, the assigning the plurality of sub-tensors and the plurality of weight groups into a plurality of processors comprises: for each of the plurality of processors, storing one or more of the plurality of sub-tensors and one or more of the plurality of weight groups into an internal buffer of the processor.

In some embodiments, the assigning the plurality of weight groups into the plurality of processors comprises: during each of a plurality of parallel-processing cycles, assigning one or more of the plurality of weight groups into the plurality of processors for the plurality of processors to perform the MAC operations based on the plurality of sub-tensors and the one or more of the plurality of weight groups in parallel.

In some embodiments, each of the one or more banks corresponds to output values generated based on one of the plurality of weight groups.

In some embodiments, the obtaining a plurality of output values based on results of the MAC operations comprises: obtaining a plurality of partial sums as a result of the MAC operations performed by the plurality of processors during each of a plurality of parallel-processing cycles; feeding the plurality of partial sums into an adder tree device to obtain one or more output values; and storing the one or more output values in an accumulation buffer for one or more of the plurality of parallel-processing cycles to obtain the plurality of output values.

In some embodiments, the performing a top-K sorting on the output values in the bank to obtain K output values comprises: performing a top-K sorting on magnitudes of the output values in the bank to obtain the K output values.

In some embodiments, each of the banks comprises: a height-dimension that is greater than zero; a width-dimension that is greater than zero; and a channel-dimension that is greater than one.

In some embodiments, the method may further comprise: representing the K non-zero output values in each of the banks respectively as K multi-dimensional vectors, wherein each of the K multi-dimensional vectors comprises a non-zero output value and a corresponding channel-dimension identifier of the non-zero output value within the bank.

In some embodiments, the constructing the output tensor of the convolution layer based on the pruned banks comprises: assembling the K multi-dimensional vectors of each of the banks to form the output tensor.

In some embodiments, each of the pruned banks is associated with a bank identifier, and the constructing the output tensor of the convolution layer based on the pruned banks comprises: assembling the K multi-dimensional vectors of each of the banks based on the corresponding bank identifier to form the output tensor.

In some embodiments, the output tensor is a sparse tensor.

According to another aspect, a system for convolution with workload-balanced activation sparsity is provided. The system may comprise one or more processors and one or more non-transitory computer-readable memories coupled to the one or more processors and configured with instructions executable by the one or more processors to cause the system to perform operations comprising: assigning an input tensor and a weight tensor at a convolution layer into a plurality of processors to perform Multiply-Accumulate (MAC) operations in parallel based on the input tensor and the weight tensor; obtaining a plurality of output values based on results of the MAC operations; constructing one or more banks of output values based on the plurality of output values, wherein each of the banks comprises one or more of the plurality of output values; for each of the banks, performing a top-K sorting on the one or more output values in the bank to obtain K output values, wherein K is a positive integer; pruning each of the banks by setting the one or more output values other than the obtained K output values in the each bank as zeros; and constructing an output tensor of the convolution layer based on the pruned banks.

According to yet another aspect, a non-transitory computer-readable storage medium for convolution with workload-balanced activation sparsity is provided. The medium may be configured with instructions executable by one or more processors to cause the one or more processors to perform operations comprising: assigning an input tensor and a weight tensor at a convolution layer into a plurality of processors to perform Multiply-Accumulate (MAC) operations in parallel based on the input tensor and the weight tensor; obtaining a plurality of output values based on results of the MAC operations; constructing one or more banks of output values based on the plurality of output values, wherein each of the banks comprises one or more of the plurality of output values; for each of the banks, performing a top-K sorting on the one or more output values in the bank to obtain K output values, wherein K is a positive integer; pruning each of the banks by setting the one or more output values other than the obtained K output values in the each bank as zeros; and constructing an output tensor of the convolution layer based on the pruned banks.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 7 illustrates an example method for convolution with workload-balanced activation sparsity in accordance with various embodiments.

DETAILED DESCRIPTION

Figure 1:
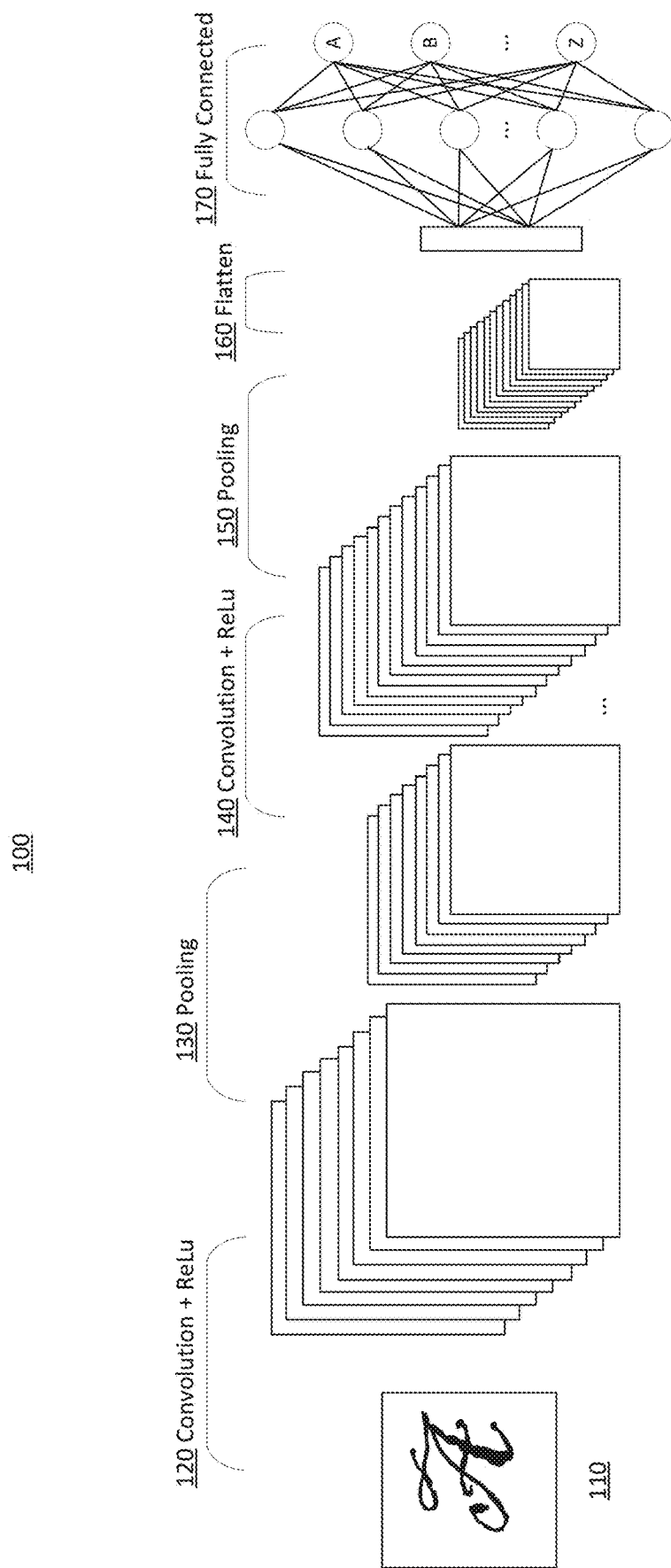
FIG. 1 illustrates an exemplary convolutional neural network (CNN) in accordance with various embodiments.

Embodiments described herein provide methods, systems, apparatus for convolution with workload-balanced activation sparsity in neural networks. A convolution process may refer to a fundamental but computationally expensive operation to extract features from input data. The convolution process usually occurs at a convolution layer within a neural network. The input data to a convolution layer may include a feature map derived from an image or an audio wave, or an activation tensor received from a previous layer, and may be referred to as an input tensor. The output of the convolution layer may be referred to as an output tensor. In some embodiments, the input tensor and output tensor may be both referred to as activations. The input tensor may comprise multiple channels of feature maps. For example, an RGB image may be represented as an input tensor with three channels (red channel, green channel, and blue channel), with each channel comprising a feature map (e.g., a grayscale image of the same size as the original RGB image but made of just one of the red, green, or blue colors). To extract features from an input tensor, one or more feature extractors (also called weight tensors or filters) may be applied to the input tensor in a convolving (e.g., sliding or moving) manner. Multiplication and accumulation (MAC) operations between the feature detectors (weight tensors or filters) and the input tensor may be performed during each convolving step. The outputs generated from the convolving steps may be subsequently assembled to form the output tensor of the convolution layer. The output tensor may become the input tensor of the next layer in the neural network. In some cases, multiple input tensors may be processed in one convolution layer.

During a convolution process, the input tensors and/or the weight tensors may be pruned or sparsified by introducing a large number of zeros to reduce the computation cost and improve inferencing speed. For example, more than 50% of the values in the input tensors may be set to zeros. Since a convolution process is usually carried out in a parallel processing framework (a cluster of processors, cores, or another type of processing entities), unstructured or unbalanced pruning of the input tensors may cause workload imbalance among the processing entities (PEs), which may lead to poor system scalability and performance. Therefore, an important goal of pruning the input tensors may include balancing the workload among the processing units during parallel convolution.

In some embodiments, the input tensor may be first segmented into a plurality of sub-tensors according to the number of PEs that are available to participate in the convolution process. Each of the sub-tensors may be assigned to one of the plurality of PEs and stay therein throughout multiple convolution processes (corresponding to multiple convolution layers in a NN) without swapping out of the PE's local memory/buffer. After each convolution process, the sub-tensor assigned to the PE as an input may be updated and evolved into an output, which may be used as the input for the next convolution process. In some embodiments, the updated sub-tensor may be swapped out of the PE temporarily for memory management purposes and swapped back in for the next iteration.

In some embodiments, each of the weight tensors may be segmented into a plurality of weight groups, each of which may be stored in one of the plurality of PEs to perform local MAC operations with the assigned sub-tensors (a portion of the input tensor). In some embodiments, the plurality of weight groups may be rotated among the plurality of PEs to convolve with other sub-tensors, until the convolution process is complete. The output values from the plurality of PEs may be accumulated along the way and eventually assembled as an output tensor of the convolution process.

The above-described segmentation and parallel processing scheme are also highly scalable. In some embodiments, each round (also called iteration) of the parallel processing may generate a plurality of partial sums, and the plurality of PEs may perform the parallel processing for multiple rounds to accumulate the partial sums generated in each round and assemble the accumulated results as an output tensor. In some embodiments, the partial sums generated by each PE across the multiple rounds may be directly accumulated (within each PE) to generate a portion of the output tensor without the need to exchange data with other PEs.

In the following description, specific, non-limiting embodiments of the present invention will be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

FIG. 1 illustrates an exemplary convolutional neural network (CNN) in accordance with various embodiments. CNN is widely used in a variety of applications including image understanding, speech recognition, gameplay, robotics, and may employ a deep hierarchy of layers including convolutional layers, where convolution operations occur. It may be noted that CNN is only used for illustrative purposes, the embodiments disclosed herein may be applied to other neural networks that involve convolution operations.

The exemplary neural network 100 illustrated in FIG. 1 comprises a plurality of layers such as a first convolution layer 120 and a first ReLU (Rectified Linear Unit) layer, a first pooling layer 130, a second convolution layer 140 and a second ReLU layer, a second pooling layer 150, a flattening layer 160, and a fully connected (FC) layer 170. This exemplary neural network 100 may be trained to match an alphabet in a given image with a plurality of known alphabet classes. As shown in FIG. 1, an image 110 with a letter is fed into the neural network 100 and transformed through the plurality of layers. The last layer (the FC layer 170) eventually generates a plurality of scores representing the similarity between the letter in the input image 110 and each of the known alphabet classes.

In some embodiments, the input image 110 may be first transformed into an input tensor. As an example, if the input image 110 contains 32*32 pixels and each pixel has three color channels (Red, Green, Blue), its corresponding input tensor may have a size of 32*32*3, with a height as 32, a width as 32, and a depth (e.g., number of channels) as 3. For ease of description, the three-dimensional size may be called an HWC format, where H refers to the height of the input tensor (e.g., 32 in the previous image example), W refers to the width of the input tensor (e.g., 32 in the previous image example), and C refers to the number of channels in the input tensor (e.g., 3 in the previous image example). In some cases, if there are multiple input tensors for a convolutional layer (e.g., when there are multiple images input into the convolution layer, or there are multiple input activation tensors received from a previous layer), each input tensor may be represented in an NHWC format, where N refers to an index of the input tensor within the batch of input tensors. In the following description, N may be omitted for simplicity (e.g., assuming there is only one input tensor) unless explicitly stated otherwise. It may be obvious for a person in the art to expand the embodiments to cover the cases with N>1.

In some embodiments, a CNN may include multiple convolution layers (e.g., the first convolution layer 120 and the second convolution layer 140 in FIG. 1). A convolution layer reduces an input tensor (e.g., the original input image, or an input tensor from a previous layer) into a form that is easier to process without losing features that are critical for getting a good prediction/classification. One or more feature detectors, e.g., edge detector, curve detector in image processing, may be involved in the convolution process in the convolution layer. These feature detectors may be referred to as filters, weight tensors, kernels, which are used interchangeably in this description. Each of the filters may have the same number of channels as the input tensor does. For ease of description, this specification uses the term "sharing a plurality of channels" to express that each filter and the input tensor have the same number of channels. For example, the input tensor is a 32*32*3 matrix and an example filter may be a 3*3*3 matrix. A detailed explanation of the convolution process may refer to the description of FIG. 2.

In some embodiments, a convolution layer in a CNN may be followed by a nonlinear activation function to introduce nonlinearity into the CNN. Exemplary nonlinear activation functions include sigmoid, hyperbolic tangent, and rectified linear unit (ReLU). As shown in FIG. 1, a ReLU function (may also be referred to as a ReLU layer) follows each of the convolutional layers 120 and 140. The ReLU function may apply an elementwise activation function to filter out some outputs (activations) generated by the convolution layer 120 or 140. For example, a max(0,x) function may be used to filter out all the negative activations in the convolution output and only feed the positive activations to the next layer. A ReLU function may not change the size of the output activation, but limit the number of active neurons, since the negative activations are all zero-ed out, in order to improve the computational efficiency in the following layers.

In some embodiments, the CNN may also include one or more pooling layers to provide a variety of computations that reduce the dimensionality of input tensors. In FIG. 1, the first pooling layer 130 and the second pooling layer 150 of the neural network 100 may each perform a down-sampling operation on the input tensor along the spatial dimension (height and width), but usually do not change the depth dimension (e.g., the number of channels).

In some embodiments, a fully-connected (FC) layer in a neural network may learn nonlinear combinations of high-level features as represented by the output from the previous layer (e.g., a pooling layer 150 in FIG. 1, or a convolution layer) and compute class scores accordingly. Referring to FIG. 1, the output from the pooling layer 150 may be first flattened (e.g., in a flatten layer 160) into a vector, from which an inherent non-learning function in that space may be learned by the FC layer 170 to calculate the final scores for a plurality of classes. Each of the scores may represent a quantified similarity between the alphabet in the input image and the corresponding class.

Figure 2:
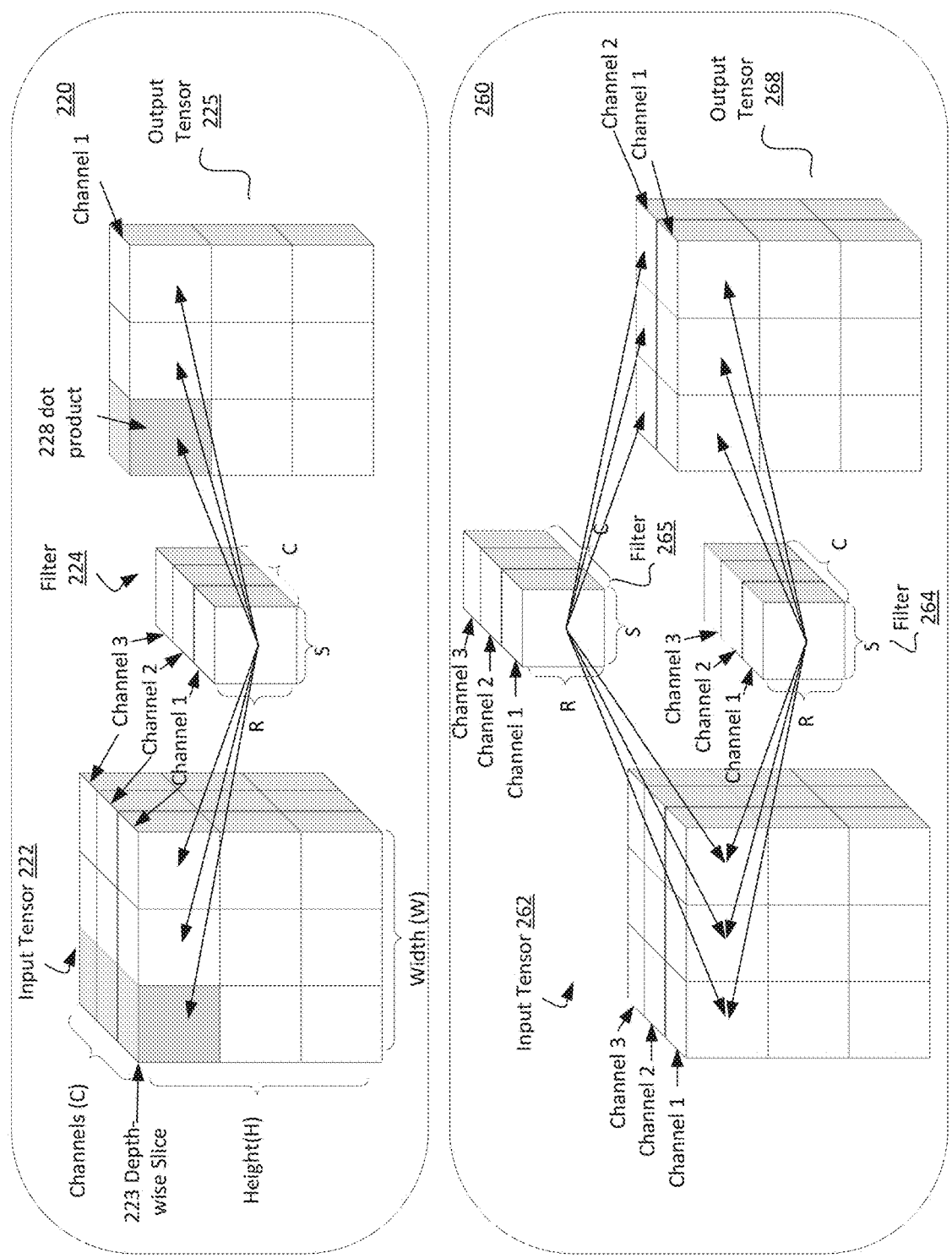
FIG. 2 illustrates an exemplary convolution process in accordance with various embodiments.

FIG. 2 illustrates an exemplary convolution process in accordance with various embodiments. A typical convolution process in a neural network may start with receiving (or obtaining) one or more input tensors and a plurality of filters, and performing the convolution process to generate one or more output tensors. For simplicity, the exemplary convolution process 220 in FIG. 2 involves one input tensor 222, one filter 224, and one output tensor 225. The input tensor 222 may be denoted by its height (H), width (W), and the number of channels (C). As shown in FIG. 2, the input tensor 222 may be a 3*3*3 matrix, with a height of 3, a width of 3, and a number of channels as 3. The height and the width (e.g., 3(H)*3(W)) of the input tensor 222 in each channel may be referred to as a 2-D input feature map. A tuple of {h, w, c} may point to one element of the 2-D input feature map in channel c. For example, {2,1,1} may point to the element of the 2-D input feature map in channel 1, with a position defined by {2,1} (e.g., height-wise index is 2, and width-wise index is 1). The filter 224 may be denoted by its height (R), width (S), and the number of channels (C). In FIG. 2, the filter 224 may be a 1*1*3 matrix. The height and the width (e.g., 1(R)*1(S)) of the filter 224 in each channel may be referred to as a kernel (the filter 224 has three kernels in the three channels, respectively).

In some scenarios, a convolution process may involve stride and padding. For example, when the stride is 1, a filter convolves (e.g., moves, slides) one pixel at a time; and when the stride is 2, the filter convolves two pixels at a time as it slides around. A larger stride produces a spatially smaller output tensor (smaller H*W in the output tensor). As another example, when a filter's spatial size (height*width) is greater than 1*1 (e.g., 3*3, or 5*5), the input tensor may pad with zeros around its borders in order to apply the filter and control the spatial size of the output tensor, e.g., to preserve the spatial size of the input tensor so that the input and output height and width are the same. In FIG. 2, it is assumed that no padding is performed to the input tensor 222 and the stride is 1.

During the convolution process 220 shown in FIG. 2, MAC operations are performed on the filter 224 and each depth-wise slice, such as the first depth-wise slice 223, of the input tensor to generate a dot product, such as the dot product 228. For example, the first depth-wise slice 223 of the input tensor 222 is a 1*1*3 tensor at the top left of the input tensor 222 (the three grey cubes). Both the first depth-wise slice 223 and the filter 224 have a size of 1*1*3. After the MAC operations, the generated dot product 228 may be assembled as a part of the output tensor 225. As such, the output tensor 225 may be determined after the filter 224 convolves (e.g., moves) through all the depth-wise slices in the input tensor 222 (9 slices in FIG. 2). The number of channels in the output tensor 225 equals the number of filters that have been applied during the convolution. Since the convolution process 220 only uses one filter 224, the corresponding output tensor 228 only has one channel.

In comparison, the convolution process 260 involves two filters 264 and 265. By convolving the filter 264 through the input tensor 262, the values of the output tensor 268 in the first channel (e.g., a 2-D output feature map in channel 1) may be determined. By convolving the filter 265 through the input tensor 262, the values of the output tensor 268 in the second channel (e.g., a 2-D output feature map in channel 2) may be determined. Accordingly, the resulting output tensor 268 comprises two channels of 2-D output feature maps.

It may be noted that some operations during a convolution process may be parallelized. For example, MAC operations performed on a filter are independent of the ones of another filter as different filters generate 2-D output feature maps for different output channels. As another example, the depth-wise slices in the input tensors are independent of each other as they generate values for different positions on each 2-D output feature map. The theoretically ideal parallelism may be achieved if all these operations can be parallelized among a plurality of processing entities (e.g., processors, cores, or threads). However, since real-world applications may have a large number of filters and massive input tensors, chasing the theoretically ideal parallelism may require hardware with unattainable computing capacities (e.g., with an enormous number of processing entities and memory exchanging mechanism). The embodiments disclosed in the following description provide a method (and corresponding system, storage medium) to achieve the ideal parallelism by fully utilizing the parallel processing capability of given hardware, which is a more scalable and practical approach.

Figure 3:
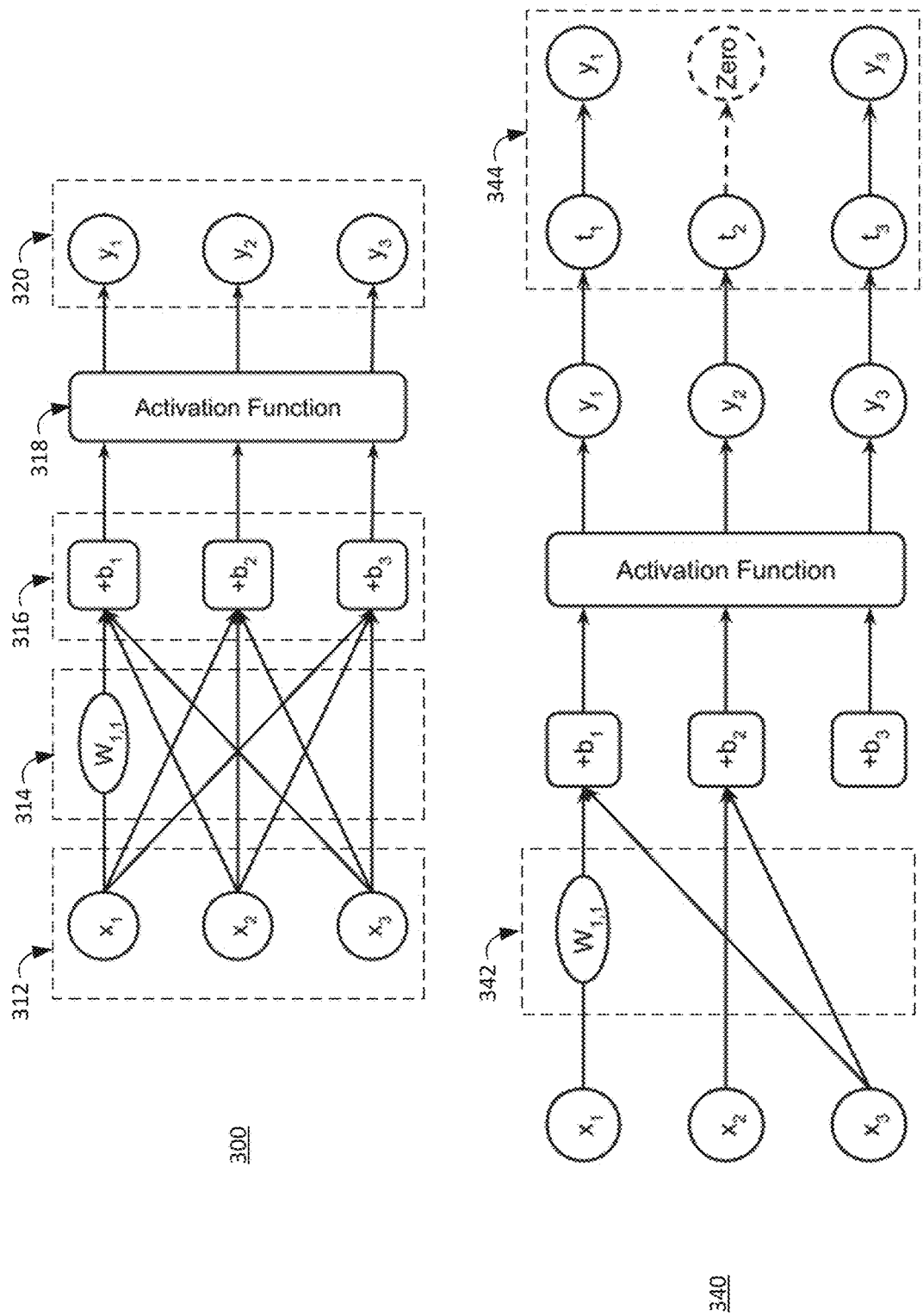
FIG. 3 illustrates an exemplary diagram of a neural network layer and an exemplary diagram of weight pruning and activation pruning, in accordance with various embodiments.

FIG. 3 illustrates an exemplary diagram 300 of a neural network layer and an exemplary diagram 340 of weight pruning and activation pruning, in accordance with various embodiments. The diagram 300 shows an abstract view of a neural network layer, specifically, a convolution layer. The convolution layer in FIG. 3 includes (1) a plurality of input activations 312 (e.g., input values in the input tensor) denoted as $x_1$, $x_2$, and $x_3$, which may refer to input values of one or more input tensors, (2) one or more weights 314 denoted as $W_{1,1}$, which may refer to weights of filters/weight tensors/feature extractors, (3) optionally, one or more biases 316 for tuning (along with the weights 314) the activations 312, (3) an activation function 318 to determine whether a neuron should be activated or not, and (4) a plurality of output activations 320 (e.g., output values in the output tensor) denoted as $y_1$, $y_2$, and $y_3$. The diagram 300 only shows one weight 314 for illustrative purposes and may include more weights. Exemplary activation functions 318 may include Sigmod, Hyperbolic Tangent (TanH), ReLu, or another suitable activation function.

The diagram 340 in FIG. 3 illustrates an exemplary neural network with weight pruning 342 and activation pruning 344. The weight pruning 342 and activation pruning 344 may introduce sparsity into the convolution process to reduce energy and realize higher throughput. As shown, the weight pruning 342 may reduce the number of non-zero weights in the filters so that less number of convolution operations need to be performed between the input activations (e.g., x1, x2, x3) and the weights. In some embodiments, the activation pruning 344 may involve applying masks (e.g., t1, t2, t3) to the output activations (e.g., $y_1$, $y_2$, $y_3$). The masks may set some of the output activations as zero (e.g., de-active the output). In FIG. 3, the mask t2 sets the output activation $y_2$ as zero, while the masks t1 and t3 do not change the corresponding output activations $y_1$ and $y_3$. This way, the resultant output activations are pruned to contain some zero values, which may be helpful to reduce the computational cost for the next layers.

However, the mask-based method illustrated in FIG. 3 may fail to balance (e.g., evenly distribute) the non-zero output activations. Since the convolution process is usually executed in a parallel processing architecture using multiple processors, imbalance output activations may lead to workload imbalance among the processors and limit the scalability and throughput of the architecture. In the following description, a workload-balanced activation pruning method and architecture is described with illustrative embodiments.

Figure 4:
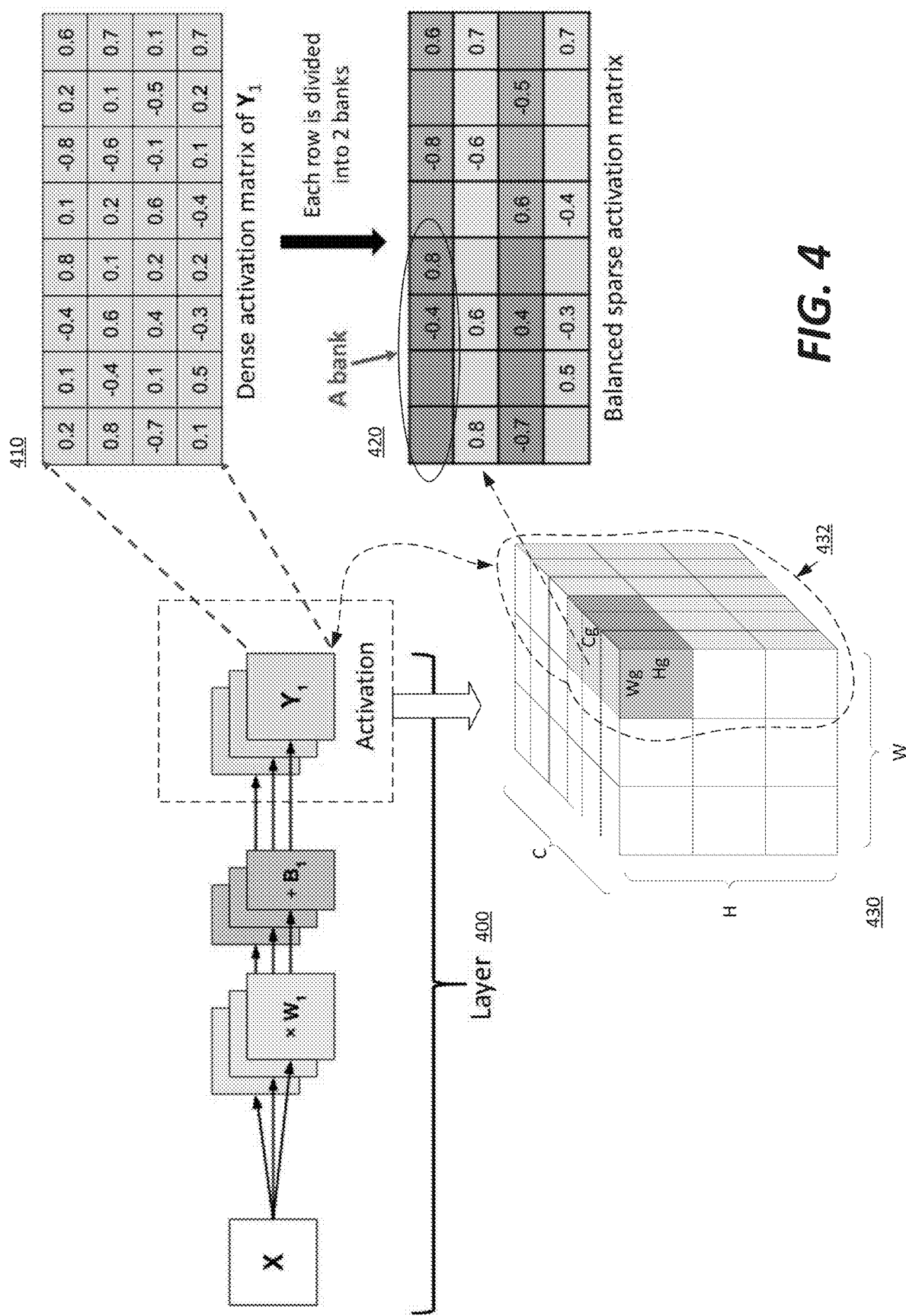
FIG. 4 illustrates an exemplary diagram for workload-balanced activation pruning in accordance with various embodiments.

FIG. 4 illustrates an exemplary diagram for workload-balanced activation pruning in accordance with various embodiments. The exemplary neural network layer 400 may refer to another view of the exemplary neural network layers 300 or 340 in FIG. 3. In the exemplary neural network layer 400 may start with a convolution process between an input tensor X and a plurality of filters/weight tensors, and may optionally involve a bias layer to tune the convolution results before generating the output activations. Taking one of the filters $W_1$ as an example, the convolution process between the input tensor X and the filter $W_1$ (along with the corresponding bias tensor B1) may generate a portion of an output tensor $Y_1$.

In some embodiments, the portion of the output tensor $Y_1$ may be a dense activation matrix represented as table 410. The matrix 410 is "dense" because it may include a large number of non-zero values. In some embodiments, the dense matrix 410 may be pruned into a balanced sparse activation matrix 420 by constructing one or more banks of output values, where each of the banks includes a same number of non-zero output values. As shown in FIG. 4, two banks of output values may be constructed based on each row of the dense matrix 410. Each row of the dense matrix 410 may include eight non-zero output values, and the two banks may evenly divide the row so that each bank includes four non-zero output values.

In some embodiments, in order to prune the activations in a balanced manner, a same number of the output values in each bank may be kept as non-zeros, and other output values may be pruned to zeros. In some embodiments, the output values to be kept as non-zeros in each bank may be determined by a top-K sorting operation. The top-K sorting operation in each bank may select K non-zero values with the largest magnitudes to retain their values, and the other non-zero values may be set to zeros. As shown in FIG. 4, a first bank may be constructed with the top-left four non-zero values (0.2, 0.1, −0.4, and 0.8) in the dense matrix 410. A top-2 sorting (e.g., K=2) in the first bank may detect the two non-zero values with the largest magnitudes (e.g., the absolute values), which are −0.4 and 0.8 in this case. Subsequently, the −0.4 and 0.8 in the first bank are kept as is, but the other values 0.2 and 0.1 therein are pruned to zeros. The same process may be parallelly executed in the other banks to generate the balanced sparse activation matrix 420.

The above-described activation process may be customized in various ways to achieve the desired result. For example, the value of K may be configured to a large number if more non-zero activations are preferred, or to a small number if a greater sparsity is preferred. As another example, the size of the banks may be configured to determine how the non-zero activations are distributed in the output tensor.

For clarity of description, the output activations of the layer 400 may be represented as a H*W*C output tensor 430, where H is the height dimension, W is the width dimension, and C is the channel dimension. In some embodiments, each of the dimensions of the output tensor 430 may be segmented into groups. For example, the H dimension of the output tensor 430 may be divided into three groups, with each group denoted as Hg (height group). Similarly, W dimension may be divided into three Wg (width groups), and C dimension may be divided into three Cg (channel groups). In FIG. 4, it is assumed that the $Y_1$ activation corresponds to the right-most plane 432 of the output tensor, and thus the right-most plane 432 may be represented as the dense activation matrix 410 before pruning or the balanced sparse activation matrix 420 after pruning. FIG. 4 shows one exemplary configuration of the banks, where each Hg*Wg*Cg sub-tensor forms a bank. For example, the shaded Hg*Wg*Cg portion of the plane 432 may be referred to as a bank that may be represented as the top left bank of the balanced sparse matrix 420. Depending on the implementation, the banks may have different shapes by configuring Hg, Wg, and Cg to different values. In some embodiments, Cg may be configured to an integer that is greater than one (at least two), Hg may be configured to an integer that is greater than zero, and Wg may be configured to an integer that is greater than zero.

Figure 5:
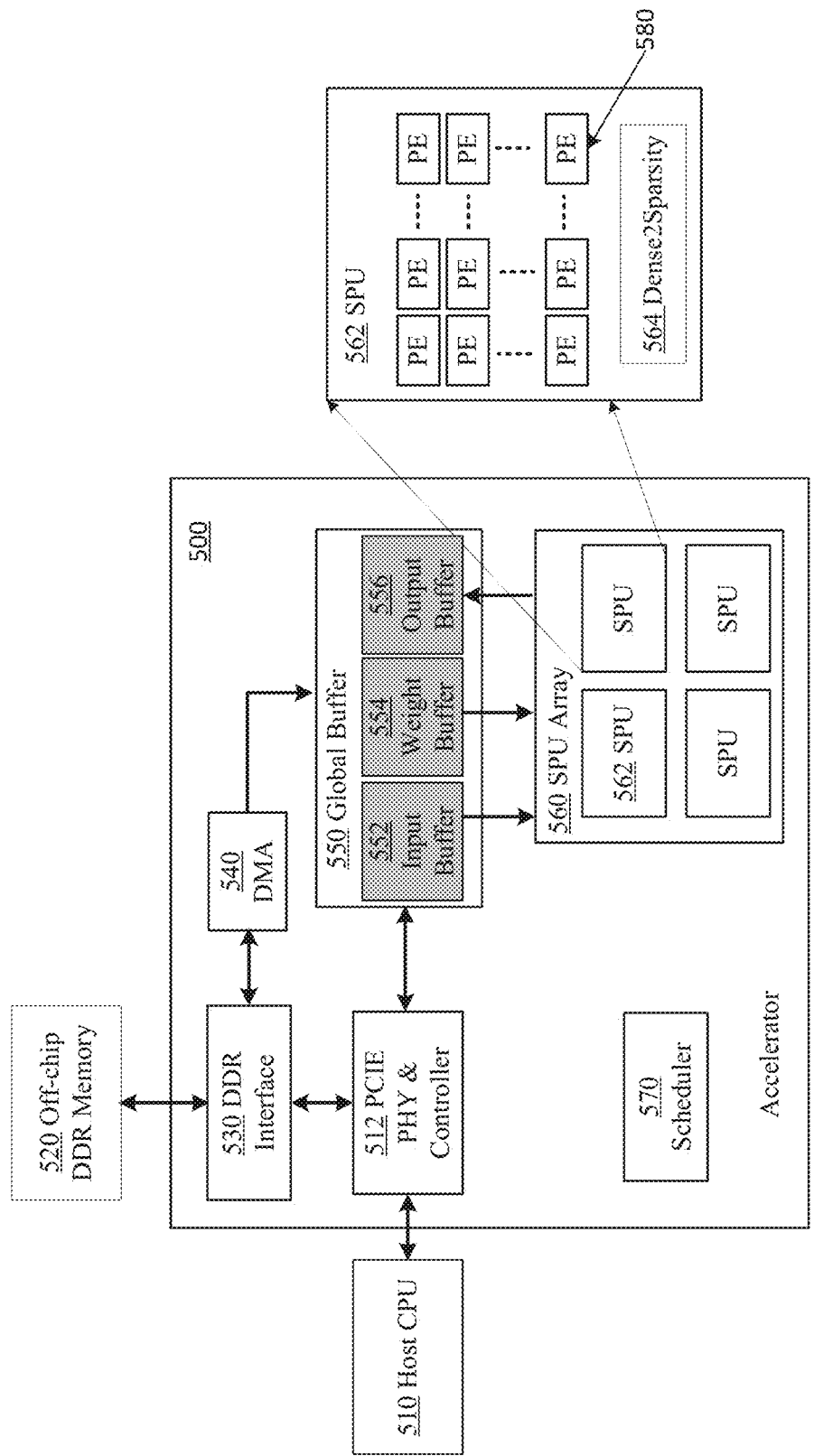
FIG. 5 illustrates an exemplary system diagram for convolution with workload-balanced activation sparsity in accordance with various embodiments.

FIG. 5 illustrates an exemplary system diagram for convolution with workload-balanced activation sparsity in accordance with various embodiments. The architecture shown in FIG. 5 comprises a computer system designed to perform inferences when a neural network is loaded and runs. In some embodiments, such a computer system is implemented as a hardware accelerator 500. Some components in the hardware accelerator 500 may collaborate in a specific way to improve the throughput and energy efficiency of neural networks by facilitating parallel convolution computations on a plurality of processing entities. The accelerator 500 is merely illustrative and may comprise more, fewer, or alternative components. The hardware accelerator 500 may be designed as a reconfigurable device such as a field-programmable gate array (FPGA) or an application-specific integrated circuit (ASIC).

As shown in FIG. 5, the hardware accelerator 500 may comprise a scheduler 570 to control the workflow within the accelerator 500 and interactions with off-chip components such as a host CPU 510 and double data rate (DDR) memories 520. For example, the accelerator 500 may interact with the host CPU 510 through a peripheral component interconnect express (PCIe) physical layer (PHY) controller 512, and an off-chip DDR memory 520 through a DDR interface 530. The accelerator 500 may fetch data from the off-chip DDR memory 520 through a direct memory access (DMA) controller 540 that communicates with the off-chip DDR memory 520 via the DDR interface 530. The fetched data may be stored in an on-chip buffer, called global buffer 550, to prepare for parallel convolution computations. The global buffer 550 may be logically divided into multiple sections, such as an input buffer 552, a weight buffer 554, and an output buffer 556. The input buffer 552 may store data associated with input tensors, the weight buffer 554 may store data associated with filters, and the output buffer 556 may store data associated with results of convolution computations (e.g., output tensors). The global buffer 550 may exchange data with an array 560 of Sparse Processing Unit (SPU) 562 to perform convolution computations. The "sparse" in the name of SPU indicates that the SPU array 560 is specifically designed to efficiently perform convolution computations involving sparsity (e.g., sparse input tensors, and/or sparse filters). Each of the SPU 562 may comprise a plurality of processing entities (PE) 580, where each PE 580 may handle a unit amount of convolution computation.

In some embodiments, each of the SPU 562 may further comprise a module to prune the output values of the convolution computations performed by the plurality of PEs 580 therein. For example, the "Dense2Sparsity" module 564 in FIG. 5 may prune the output values from the plurality of PEs 580 using the following method: constructing one or more banks of output values based on the plurality of output values (generated by the plurality of PEs 580), where each of the banks comprises one or more the plurality of output values; for each of the banks, performing a top-K sorting on the one or more output values in the bank to obtain K non-zero output values, where K is a positive integer greater than zero; and pruning each of the banks by setting the one or more output values other than the obtained K non-zero output values in the bank as zeros. In some embodiments, one K may correspond to one layer in a neural network. That is, different layers in the neural network may have different K values. The K values for the layers may be learned through machine learning.

In some embodiments, the one or more banks are equal in size (e.g., each bank contains a same number of output values), and may contain a same number of non-zero output values after pruning. The positions of the non-zero output values within each bank may be random, but the total number of the non-zero output values within each bank (e.g., an integer K that is greater one) may be the same.

Figure 6A:
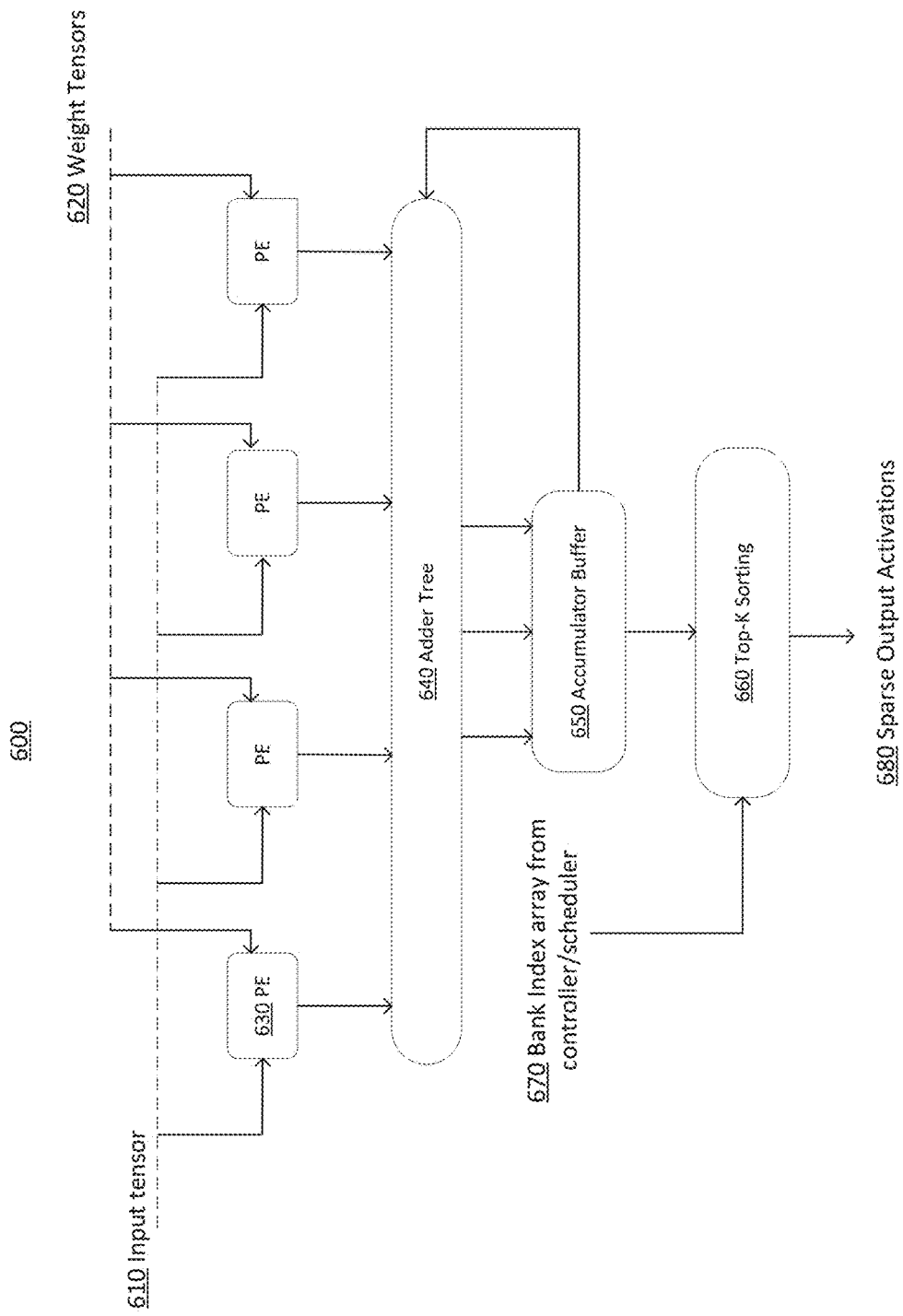
FIG. 6A illustrates an exemplary system architecture for convolution with workload-balanced activation sparsity in accordance with various embodiments.

FIG. 6A illustrates an exemplary system architecture 600 for generating an output tensor with workload-balanced activation sparsity in accordance with various embodiments. The exemplary system architecture 600 may include a plurality of PEs 630 configured to parallelly carry out convolution computations, an Adder Tree 640 configured to perform additions to the outputs (e.g., partial sums) generated by the plurality of PEs 630, an Accumulator Buffer 650 configured to accumulate the outputs (e.g., output values that will be assembled into an output tensor) generated by the Adder Tree 640, and a Top-K sorting device 660 configured to prune the outputs accumulated by the Accumulator Buffer 650. The pruning process performed by the Top-K sorting device 660 may generate the sparse output activations 680 with the non-zero activations distributed in a balanced manner. In some embodiments, the Top-K sorting device 660 may correspond to the "Dense2Sparsity" module 564 in FIG. 5. In some embodiments, the Adder Tree 640 may refer to a portion of a device, or a standalone device.

The following description uses an exemplary convolution process at a convolution layer to demonstrate how an output tensor with workload-balanced activation sparsity is generated for the convolution layer. In some embodiments, the exemplary convolution process may start with assigning an input tensor 610 and one or more weight tensors 620 at the convolution layer into a plurality of processors (PEs 630) to perform Multiply-Accumulate (MAC) operations in parallel based on the input tensor 610 and the weight tensors 620.

In some embodiments, the input tensor 610 may be segmented into a plurality of sub-tensors and assigned to the plurality of PEs 630, and the weight tensors 620 may be segmented into a plurality of weight groups and similarly assigned to the plurality of PEs 630. In some embodiments, the "assigning" of the sub-tensors and the weight groups may refer to storing them into internal buffers of the PEs 630.

In some embodiments, after receiving the assigned sub-tensors and the weight groups, the plurality of PEs 630 may parallelly perform the MAC operations to obtain a plurality of partial sums. These partial sums may be fed into the Adder Tree 640 to obtain one or more output values, which may be accumulated and stored in the accumulator buffer 650. When the output values in the accumulator buffer 650 are sufficient to form a full bank, the output values may be fed into the Top-K sorting device 660 for pruning. In some embodiments, the size of the bank is predetermined. Exemplary configurations of the banks may refer to the description in FIG. 4. In some embodiments, some of the output values in the accumulator buffer 650 may be fed back to the adder tree 640 to be added to the newly generated partial sums by the PEs 630. In some embodiments, when a full bank of output values are being fed into the Top-K sorting device 660, a controller or scheduler (e.g., scheduler 570 in FIG. 5) may send the corresponding index of the bank 670 to the Top-K sorting device 660. When there is more than one bank of output values are being fed into the Top-K sorting device 660, the controller or scheduler may send an array of the bank indexes 670 to the Top-K sorting device 660.

Depending on the granularity of the segmentation of the input tensor 610/the weight tensors 620 and the size of the banks, the accumulator buffer 650 may produce full banks of output values at a different rate. In some embodiments, the plurality of PEs 630 may need to perform the parallel convolution process for a plurality of cycles (also called parallel processing cycles) for the accumulator buffer 650 to accumulate one full bank of output values. In some embodiments, the accumulator buffer 650 may accumulate one or more full banks of output values based on the partial sums generated by the plurality of PEs 630 during each parallel processing cycle.

To simplify the description of the relationship between the granularity of the segmentation and the generation rate of the full banks, it is assumed that there is only one input tensor and the bank size is denoted as K. For example, if the PEs parallelly handle one weight tensor and the corresponding input values during each parallel processing cycle, one full bank of output values may be accumulated for every K parallel processing cycles. As another example, if the PEs parallelly handle K weight tensors and the corresponding input values during each parallel processing cycle, one full bank of output values may be generated for every parallel processing cycle. As yet another example, if the PEs parallelly handle N*K weight tensors and the corresponding input values during each parallel processing cycle, N full banks of output values may be generated for each parallel processing cycle.

In some embodiments, the Top-K sorting device 680 performs a top-K sorting logic on the magnitudes of the output values in the bank to obtain the K output values with the greatest magnitudes. The top-K sorting logic may be implemented by a hardware-based bitonic sorter combined with at least one of the following software sorting algorithms: a heap-sorting algorithm, a merge sort algorithm, a quick sort algorithm, another suitable sorting algorithm. In some embodiments, the K output values may be kept as is (e.g., as the original non-zero values), and the other output values may be pruned as zeros. Assuming each bank has N output values, the above-described pruning process may leave each bank with K non-zero values of the greatest magnitudes and (N-K) zero values. By ingesting sparsity into the banks and distributing the non-zero output values (non-zero activations) in a balanced manner, the output activations assembled from the banks may provide an input tensor with workload-balanced activation sparsity for the next convolution layer.

In some embodiments, the pruned banks may be assembled to construct the output tensor of the convolution layer. The output tensor is both sparse and balanced (e.g., the non-zero activations are distributed in a balanced manner among the banks). This will benefit the parallel convolution processing at the next convolution layer by allowing the plurality of PEs to evenly distribute the workloads.

Figure 6B:
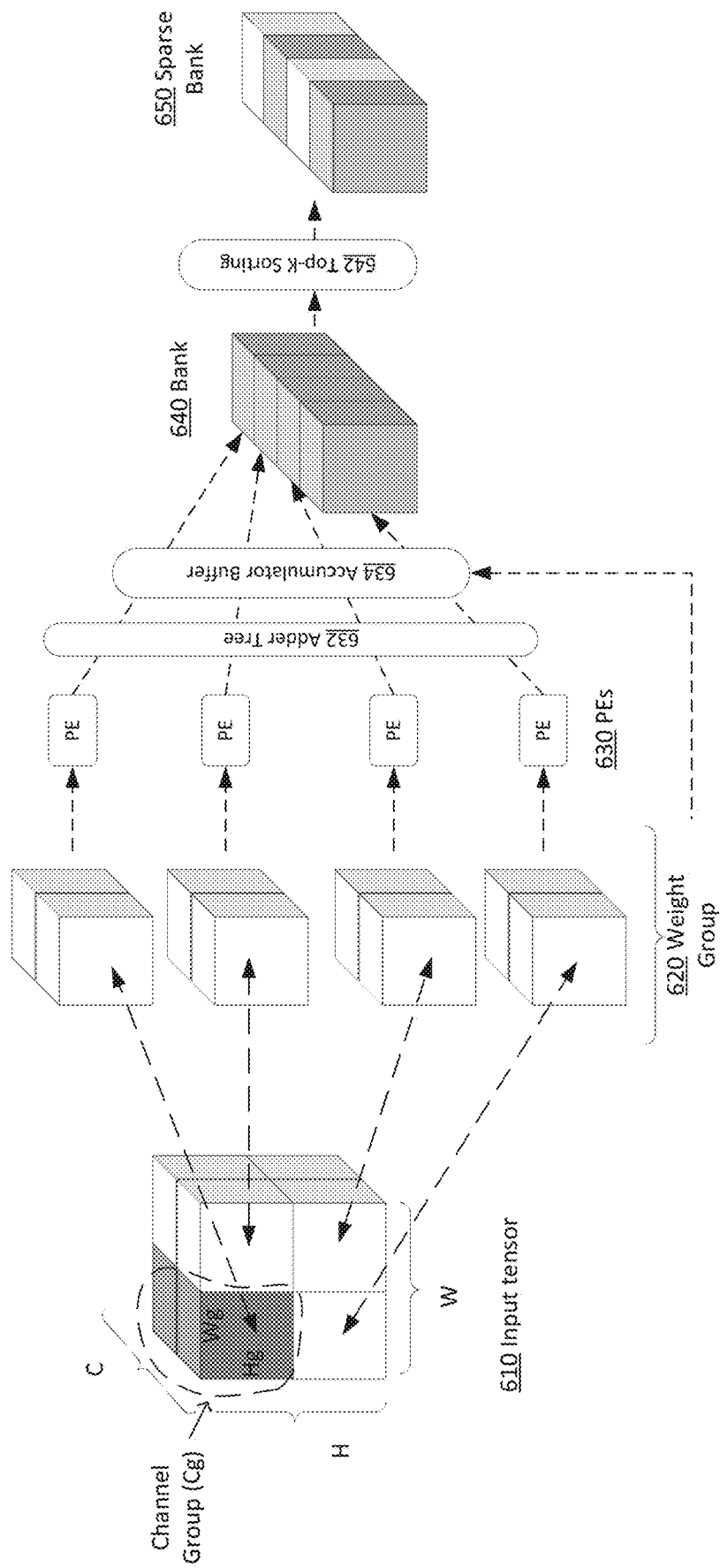
FIG. 6B illustrates an exemplary flow chart for generating an output tensor with workload-balanced activation sparsity in accordance with various embodiments.

FIG. 6B illustrates an exemplary flow chart for generating an output tensor with workload-balanced activation sparsity in accordance with various embodiments. The flow chart in FIG. 6 demonstrates a simplified version of a convolution process at a convolution layer during one parallel processing cycle. For simplicity and clarity, it is assumed that a H*W*C input tensor 610 has already been segmented into four Hg*Wg*Cg input sub-tensors (e.g., the shaded area in the input tensor 610 in FIG. 6), a weight group 620 includes four weight tensors that share the same dimension as the input sub-tensors, and there are four PEs 630 available for parallelly performing the MAC operations. These assumptions may be relaxed or changed depending on actual use cases, and necessary adjustments to the workflow may be accordingly implemented.

In some embodiments, during one parallel processing cycle, each of the PEs 630 may handle one input sub-tenor and one weight tensor in the weight group 620. Here, the "handle" may refer to performing MAC operations between the input values in the input sub-tensor and the weights in the weight tensor. The PEs 630 may perform their local MAC operations in parallel. In some embodiments, the PEs 630 may generate a plurality of partial sums after the MAC operations. These partial sums may be fed into an Adder Tree device 632 to perform necessary additions, such as adding multiple partial sums together to obtain an output value. In some embodiments, the output values generated by the Adder Tree Device 632 may be fed into an Accumulator Buffer 634 for accumulation. The Accumulator Buffer 634 may keep accumulating the output values to generate full banks 640 of output values. In some embodiments, the size of the banks may be predetermined.

In some embodiments, the system architecture, input/ weight tensor segmentation, and workload distribution may be configured in a way to improve the efficiency of generating full banks of output values. In the example shown in FIG. 6, each PE 630 handles one combination of an input sub-tensor and a weight tensor, which generates one output value during a parallel processing cycle; and the four output values generated from four PEs 630 during the parallel processing cycle may form one bank 640. This way, the exemplary setup in FIG. 6 will yield one bank 640 of output values after each parallel processing cycle. In some embodiments, the weight tensors and/or the input sub-tensors may be rotated among the PEs 630 for a plurality of parallel processing cycles until the convolution process between the input tensor 610 and the weight group 620 is finished. The plurality of banks generated by the PEs 630 during the plurality of parallel processing cycles may be pruned and assembled to form the output tensor of the convolution layer.

In some embodiments, the bank 640 of output values may be fed into a Top-K sorting component 642 for pruning. The Top-K sorting component 642 may perform a top-k sorting operation on the output values in the bank 640 to identify the K output values with the greatest magnitudes (e.g., absolute values). Depending on the implementation, the Top-K sorting component 642, the Adder Tree 632, and the Accumulator Buffer 634 may be implemented as separate devices or as parts of a unified device. These K output values may retain their values, and other output values in the bank 640 may be pruned to zeros. For example, the bank 640 generated from the Accumulator Buffer 634 in FIG. 6 may contain four non-zero output values (shaded) and may be pruned into a sparse bank 650 after a top-2 sorting is performed. The top-2 sorting may identify two out of the four output values that have the greatest magnitudes and set the other two values as zeros.

In some embodiments, after the bank 640 is pruned with the top-K sorting operation into the sparse bank 650, the K non-zero values within the resultant/sparse bank 650 may not be required to be evenly distributed therein. However, since each sparse bank like 650 contains the same number of non-zero output values (activations), the output tensor assembled based on all the sparse banks will be balanced and sparse. When the sparse output tensor becomes the input tensor for the next convolution layer, the plurality of PEs may be assigned balanced workloads (e.g., each PE receives the same number of non-zero input values during each parallel processing cycle) to perform the convolution parallelly.

FIG. 7 illustrates an example method for convolution with workload-balanced activation sparsity in accordance with various embodiments. The method 700 may be performed by a device, apparatus, or system for optimizing resource allocation. The method 700 may be performed by one or more modules/components of the environment or system illustrated by FIGS. 1-6, such as the hardware accelerator 500 in FIG. 5. The operations of the method 700 presented below are intended to be illustrative. Depending on the implementation, the method 700 may include additional, fewer, or alternative steps performed in various orders or in parallel.

Block 710 includes assigning an input tensor and a weight tensor at a convolution layer into a plurality of processors to perform Multiply-Accumulate (MAC) operations in parallel based on the input tensor and the weight tensor. In some embodiments, the assigning an input tensor and a weight tensor at a convolution layer into a plurality of processors comprises: obtaining an input tensor and a plurality of weight tensors at the convolution layer in a neural network; segmenting the input tensor into a plurality of sub-tensors and assigning the plurality of sub-tensors into a plurality of processors; and segmenting the plurality of weight tensors into a plurality of weight groups and assigning the plurality of weight groups into the plurality of processors. In some embodiments, the assigning the plurality of sub-tensors and the plurality of weight groups into a plurality of processors comprises: for each of the plurality of processors, storing one or more of the plurality of sub-tensors and one or more of the plurality of weight groups into an internal buffer of the processor.

In some embodiments, the assigning the plurality of weight groups into the plurality of processors comprises: during each of a plurality of parallel-processing cycles, assigning one or more of the plurality of weight groups into the plurality of processors for the plurality of processors to perform the MAC operations based on the plurality of sub-tensors and the one or more of the plurality of weight groups in parallel. In some embodiments, each of the one or more banks corresponds to output values generated based on one of the plurality of weight groups.

Block 720 includes obtaining a plurality of output values based on results of the MAC operations. In some embodiments, the obtaining a plurality of output values based on results of the MAC operations comprises: obtaining a plurality of partial sums as a result of the MAC operations performed by the plurality of processors during each of a plurality of parallel-processing cycles; feeding the plurality of partial sums into an adder tree device to obtain one or more output values; and storing the one or more output values in an accumulation buffer for one or more of the plurality of parallel-processing cycles to obtain the plurality of output values.

Block 730 includes constructing one or more banks of output values based on the plurality of output values, where each of the banks comprises one or more of the plurality of output values. In some embodiments, each of the banks comprises: a height-dimension that is greater than zero; a width-dimension that is greater than zero; and a channel-dimension that is greater than one. In some embodiments, the method may further comprise: representing the K non-zero output values in each of the banks respectively as K multi-dimensional vectors, where each of the K multi-dimensional vectors comprises a non-zero output value and a corresponding channel-dimension identifier of the non-zero output value within the bank. In some embodiments, the constructing the output tensor of the convolution layer based on the pruned banks comprises: assembling the K multi-dimensional vectors of each of the banks to form the output tensor.

Block 740 includes, performing, for each of the banks, a top-K sorting on the one or more output values in the bank to obtain K output values, where K is a positive integer. In some embodiments, the performing a top-K sorting on the output values in the bank to obtain K output values comprises: performing a top-K sorting on magnitudes of the output values in the bank to obtain the K output values.

Block 750 includes pruning each of the banks by setting the one or more output values other than the obtained K output values in the each bank as zeros.

Block 760 includes constructing an output tensor of the convolution layer based on the pruned banks. In some embodiments, each of the pruned banks is associated with a bank identifier, and the constructing the output tensor of the convolution layer based on the pruned banks comprises: assembling the K multi-dimensional vectors of each of the banks based on the corresponding bank identifier to form the output tensor. In some embodiments, the output tensor is a sparse tensor.

Figure 8:
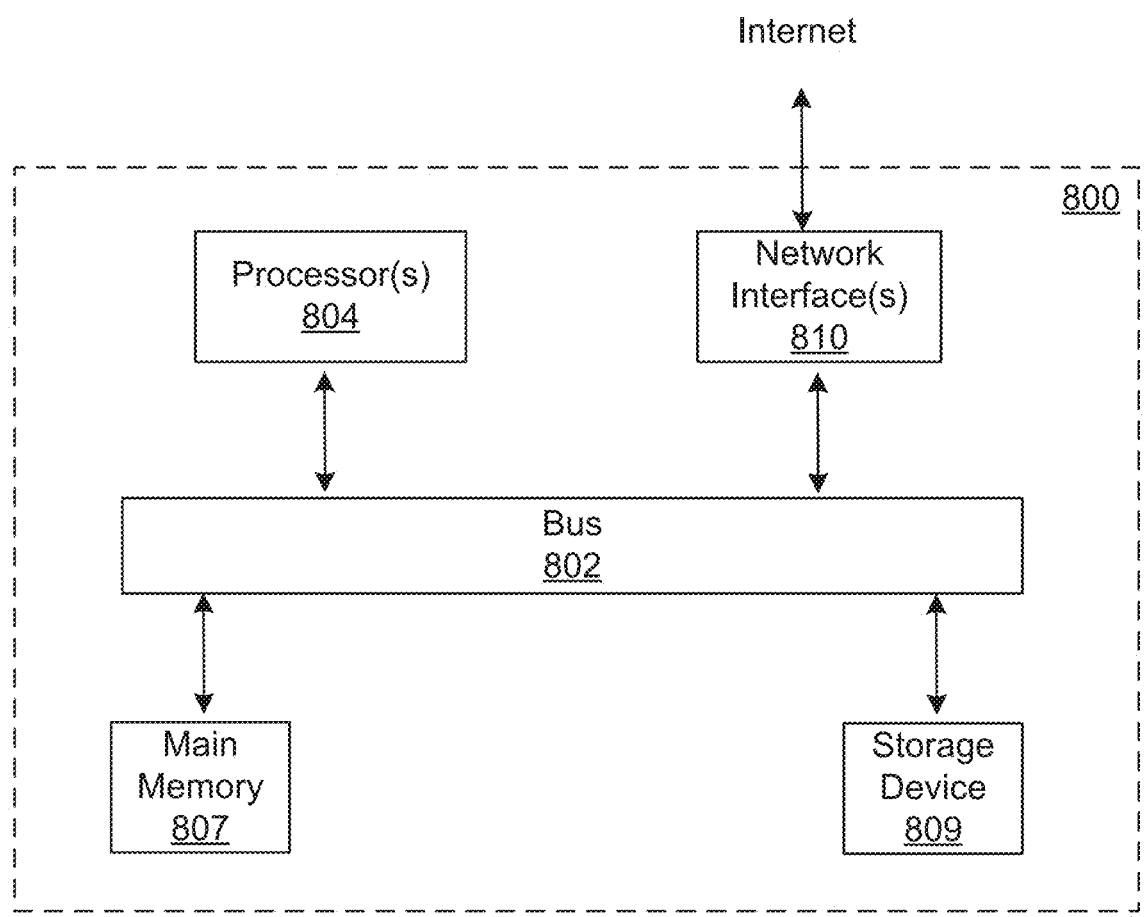
FIG. 8 illustrates an example computer system in which any of the embodiments described herein may be implemented.

FIG. 8 illustrates an example computing device in which any of the embodiments described herein may be implemented. The computing device may be used to implement one or more components of the systems and the methods shown in FIGS. 1-7. The computing device 800 may comprise a bus 802 or other communication mechanisms for communicating information and one or more hardware processors 804 coupled with bus 802 for processing information. Hardware processor(s) 804 may be, for example, one or more general-purpose microprocessors.

The computing device 800 may also include a main memory 807, such as random-access memory (RAM), cache and/or other dynamic storage devices, coupled to bus 802 for storing information and instructions to be executed by processor(s) 804. Main memory 807 also may be used for storing temporary variables or other intermediate information during execution of instructions to be executed by processor(s) 804. Such instructions, when stored in storage media accessible to processor(s) 804, may render computing device 800 into a special-purpose machine that is customized to perform the operations specified in the instructions. Main memory 807 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 800 may implement the techniques described herein using customized hard-wired logic, one or more ASICs or FPGAs, firmware and/or program logic which in combination with the computing device may cause or program computing device 800 to be a special-purpose machine. According to one embodiment, the techniques herein are performed by computing device 800 in response to processor(s) 804 executing one or more sequences of one or more instructions contained in main memory 807. Such instructions may be read into main memory 807 from another storage medium, such as storage device 809. Execution of the sequences of instructions contained in main memory 807 may cause processor(s) 804 to perform the process steps described herein. For example, the processes/methods disclosed herein may be implemented by computer program instructions stored in main memory 807. When these instructions are executed by processor(s) 804, they may perform the steps as shown in corresponding figures and described above. In alternative embodiments, hard-wired circuitry may be used in place of or in combination with software instructions.

The computing device 800 also includes a communication interface 810 coupled to bus 802. Communication interface 810 may provide a two-way data communication coupling to one or more network links that are connected to one or more networks. As another example, communication interface 810 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. A computer-implemented method, comprising:
   during a runtime convolution process, assigning an input tensor and a weight tensor at a convolution layer of a neural network into a plurality of processors to perform Multiply-Accumulate (MAC) operations in parallel based on the input tensor and the weight tensor;
   obtaining an output tensor as a convolution result between the input tensor and the weight tensor, wherein the output tensor comprises a plurality of output values;
   during the runtime convolution process:
      segmenting the output tensor into one or more banks of output values, wherein each of the banks comprises one or more of the plurality of output values;
      feeding the one or more output values of a bank back to one or more adder trees to be added to additional partial sums, thereby generating a full bank of output values for the bank;
      for each of the banks, performing a top-K sorting on the full bank of output values in the bank to obtain top-K output values, wherein K is a positive integer;
      for each of the banks, pruning the bank by zeroing out the full bank of output values except for the top-K output values, such that each of the banks of the output tensor comprises a same number of non-zero values; and
      feeding the output tensor comprising the pruned banks as an input tensor into a next layer of the neural network.

2. The method of claim 1, wherein the assigning an input tensor and a weight tensor at a convolution layer into a plurality of processors comprises:
   obtaining the input tensor and a plurality of weight tensors at the convolution layer in a neural network;
   segmenting the input tensor into a plurality of sub-tensors and assigning the plurality of sub-tensors into a plurality of processors; and
   segmenting the plurality of weight tensors into a plurality of weight groups and assigning the plurality of weight groups into the plurality of processors.

3. The method of claim 2, wherein the assigning the plurality of sub-tensors and the plurality of weight groups into a plurality of processors comprises: for each of the plurality of processors, storing one or more of the plurality of sub-tensors and one or more of the plurality of weight groups into an internal buffer of the processor.

4. The method of claim 2, wherein the assigning the plurality of weight groups into the plurality of processors comprises:
   during each of a plurality of parallel-processing cycles, assigning one or more of the plurality of weight groups into the plurality of processors for the plurality of processors to perform the MAC operations based on the plurality of sub-tensors and the one or more of the plurality of weight groups in parallel.

5. The method of claim 4, wherein each of the one or more banks corresponds to output values generated based on one of the plurality of weight groups.

6. The method of claim 1, wherein the obtaining a plurality of output values based on results of the MAC operations comprises:
   obtaining a plurality of partial sums as a result of the MAC operations performed by the plurality of processors during each of a plurality of parallel-processing cycles;
   feeding the plurality of partial sums into an adder tree device to obtain one or more output values; and
   storing the one or more output values in an accumulation buffer for one or more of the plurality of parallel-processing cycles to obtain the plurality of output values.

7. The method of claim 1, wherein the performing a top-K sorting on the output values in the bank to obtain K output values comprises:
   performing a top-K sorting on magnitudes of the output values in the bank to obtain the K output values.

8. The method of claim 1, wherein each of the banks comprises:
   a height-dimension that is greater than zero;
   a width-dimension that is greater than zero; and
   a channel-dimension that is greater than one.

9. The method of claim 1, further comprising:
   representing the top-K output values in each of the banks respectively as K multi-dimensional vectors, wherein each of the K multi-dimensional vectors comprises a non-zero output value and a corresponding channel-dimension identifier of the non-zero output value within the bank.

10. The method of claim 1, wherein the output tensor is a sparse tensor.

11. A system comprising one or more processors and one or more non-transitory computer-readable memories coupled to the one or more processors and configured with instructions executable by the one or more processors to cause the system to perform operations comprising:
   during a runtime convolution process, assigning an input tensor and a weight tensor at a convolution layer of a neural network into a plurality of processors to perform Multiply-Accumulate (MAC) operations in parallel based on the input tensor and the weight tensor;
   obtaining an output tensor as a convolution result between the input tensor and the weight tensor, wherein the output tensor comprises a plurality of output values;
   during the runtime convolution process:
      segmenting the output tensor into one or more banks of output values, wherein each of the banks comprises one or more of the plurality of output values;
      feeding the one or more output values of a bank back to one or more adder trees to be added to additional partial sums, thereby generating a full bank of output values for the bank;
      for each of the banks, performing a top-K sorting on the full bank of output values in the bank to obtain top-K output values, wherein K is a positive integer;
      for each of the banks, pruning the bank by zeroing out the full bank of output values except for the top-K output values, such that each of the banks of the output tensor comprises a same number of non-zero values; and feeding the output tensor comprising the pruned banks as an input tensor into a next layer of the neural network.

12. The system of claim 11, wherein the assigning an input tensor and a weight tensor at a convolution layer into a plurality of processors comprises:
obtaining the input tensor and a plurality of weight tensors at the convolution layer in a neural network;
segmenting the input tensor into a plurality of sub-tensors and assigning the plurality of sub-tensors into a plurality of processors; and
segmenting the plurality of weight tensors into a plurality of weight groups and assigning the plurality of weight groups into the plurality of processors.

13. The system of claim 11, wherein the obtaining a plurality of output values based on results of the MAC operations comprises:
obtaining a plurality of partial sums as a result of the MAC operations performed by the plurality of processors during each of a plurality of parallel-processing cycles;
feeding the plurality of partial sums into an adder tree device to obtain one or more output values; and
storing the one or more output values in an accumulation buffer for one or more of the plurality of parallel-processing cycles to obtain the plurality of output values.

14. The system of claim 11, wherein the performing a top-K sorting on the output values in the bank to obtain K output values comprises:
performing a top-K sorting on magnitudes of the output values in the bank to obtain the K output values.

15. A non-transitory computer-readable storage medium configured with instructions executable by one or more processors to cause the one or more processors to perform operations comprising:
during a runtime convolution process, assigning an input tensor and a weight tensor at a convolution layer of a neural network into a plurality of processors to perform Multiply-Accumulate (MAC) operations in parallel based on the input tensor and the weight tensor;
obtaining an output tensor as a convolution result between the input tensor and the weight tensor, wherein the output tensor comprises a plurality of output values;
during the runtime convolution process:
segmenting the output tensor into one or more banks of output values, wherein each of the banks comprises one or more of the plurality of output values;
feeding the one or more output values of a bank back to one or more adder trees to be added to additional partial sums, thereby generating a full bank of output values for the bank;
for each of the banks, performing a top-K sorting on the full bank of output values in the bank to obtain top-K output values, wherein K is a positive integer;
for each of the banks, pruning the bank by zeroing out the full bank of output values except for the top-K output values, such that each of the banks of the output tensor comprises a same number of non-zero values; and
feeding the output tensor comprising the pruned banks as an input tensor into a next layer of the neural network.

16. The non-transitory computer-readable storage medium of claim 15, wherein the assigning an input tensor and a weight tensor at a convolution layer into a plurality of processors comprises:
obtaining the input tensor and a plurality of weight tensors at the convolution layer in a neural network;
segmenting the input tensor into a plurality of sub-tensors and assigning the plurality of sub-tensors into a plurality of processors; and
segmenting the plurality of weight tensors into a plurality of weight groups and assigning the plurality of weight groups into the plurality of processors.

17. The non-transitory computer-readable storage medium of claim 15, wherein the obtaining a plurality of output values based on results of the MAC operations comprises:
obtaining a plurality of partial sums as a result of the MAC operations performed by the plurality of processors during each of a plurality of parallel-processing cycles;
feeding the plurality of partial sums into an adder tree device to obtain one or more output values; and
storing the one or more output values in an accumulation buffer for one or more of the plurality of parallel-processing cycles to obtain the plurality of output values.

18. The non-transitory computer-readable storage medium of claim 15, wherein the performing a top-K sorting on the output values in the bank to obtain K output values comprises:
performing a top-K sorting on magnitudes of the output values in the bank to obtain the top-K output values.

* * * * *